Oct. 13, 1953 — J. H. LAZAR — 2,655,007
SHELL FREEZER AND METHOD OF FREEZING LIQUIDS
Filed May 29, 1951 — 5 Sheets-Sheet 1
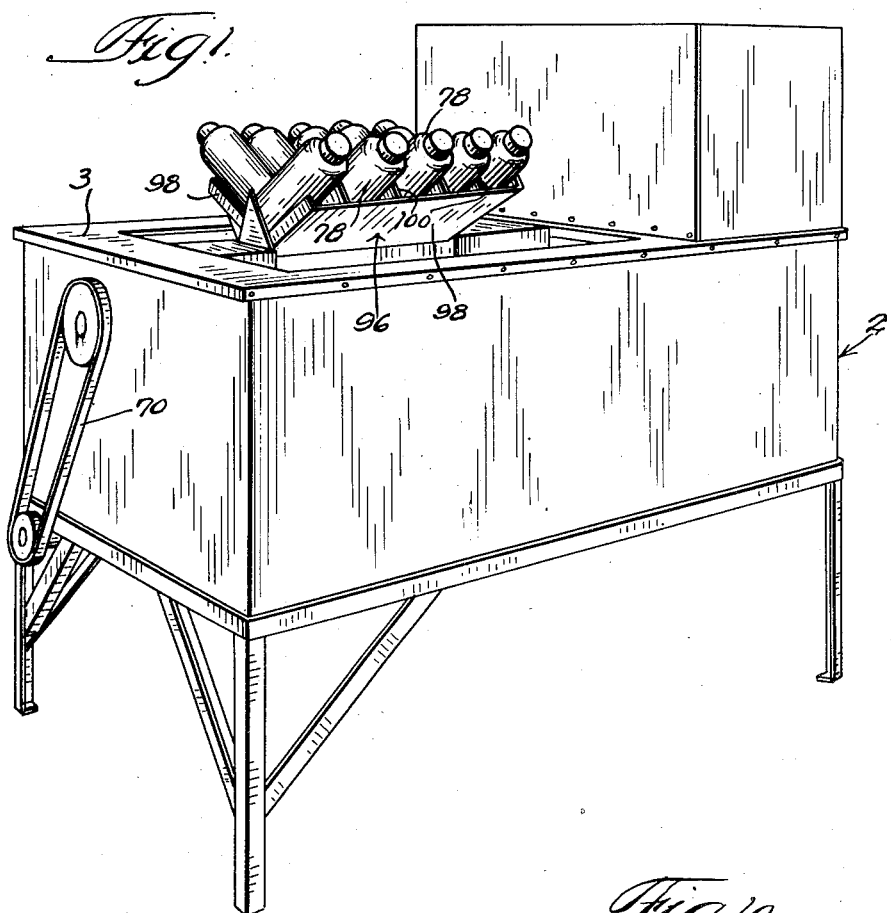
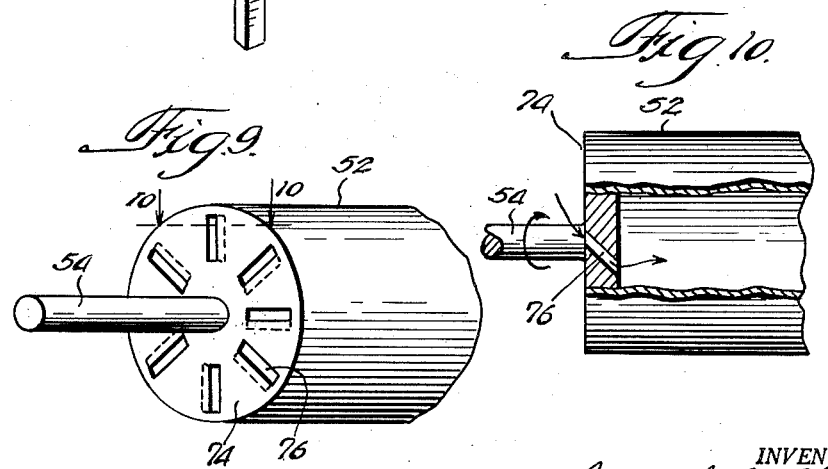
INVENTOR.
Joseph H. Lazar
BY B. Gordon Aller
Atty.

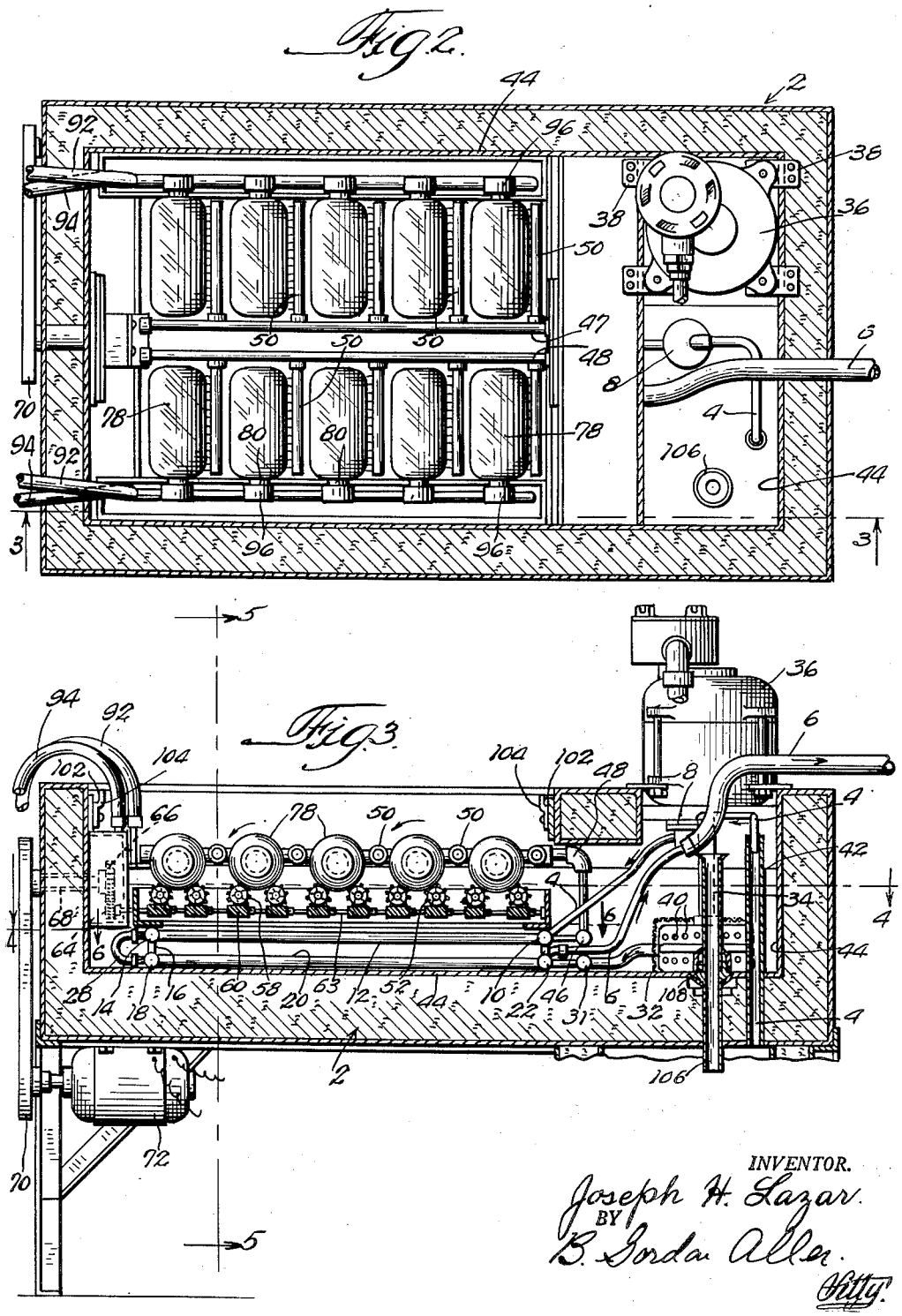

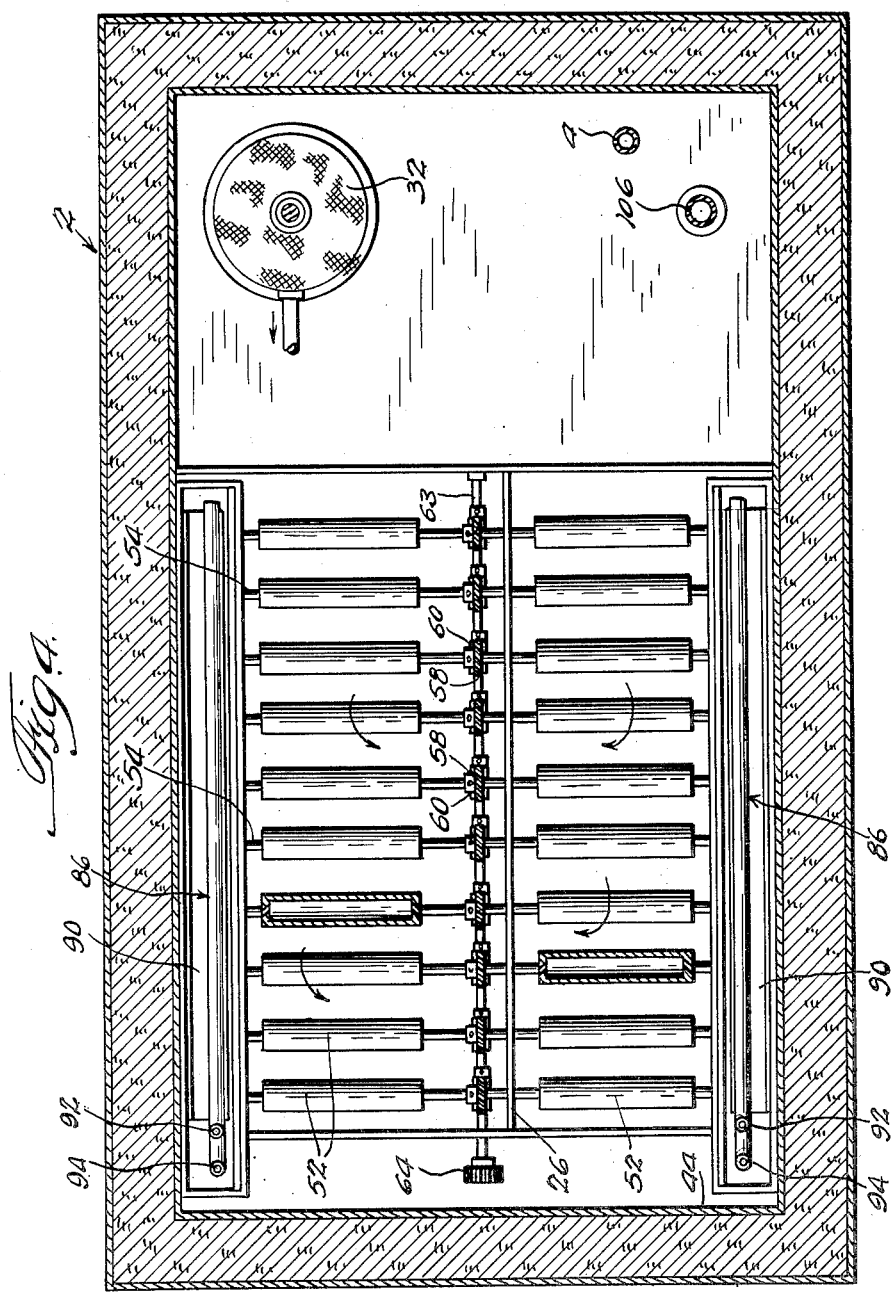

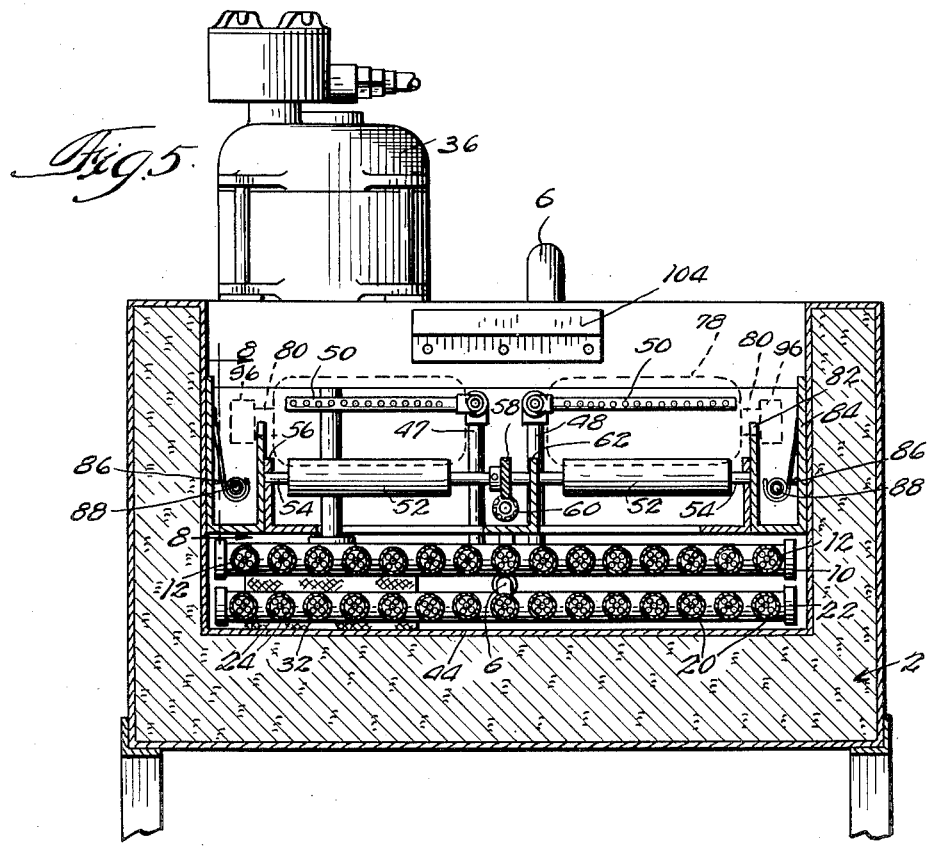
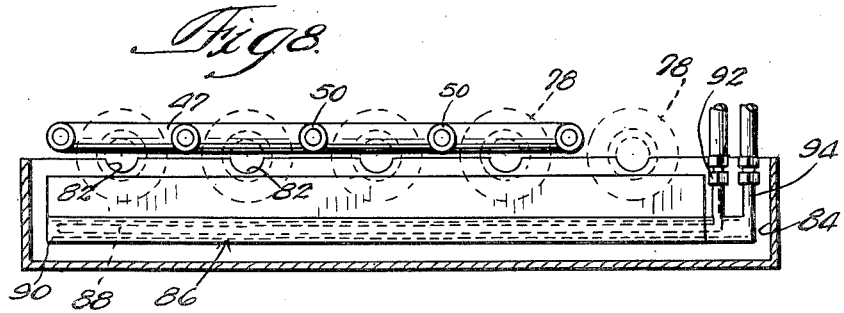

Oct. 13, 1953   J. H. LAZAR   2,655,007
SHELL FREEZER AND METHOD OF FREEZING LIQUIDS
Filed May 29, 1951   5 Sheets—Sheet 5
Fig. 6.
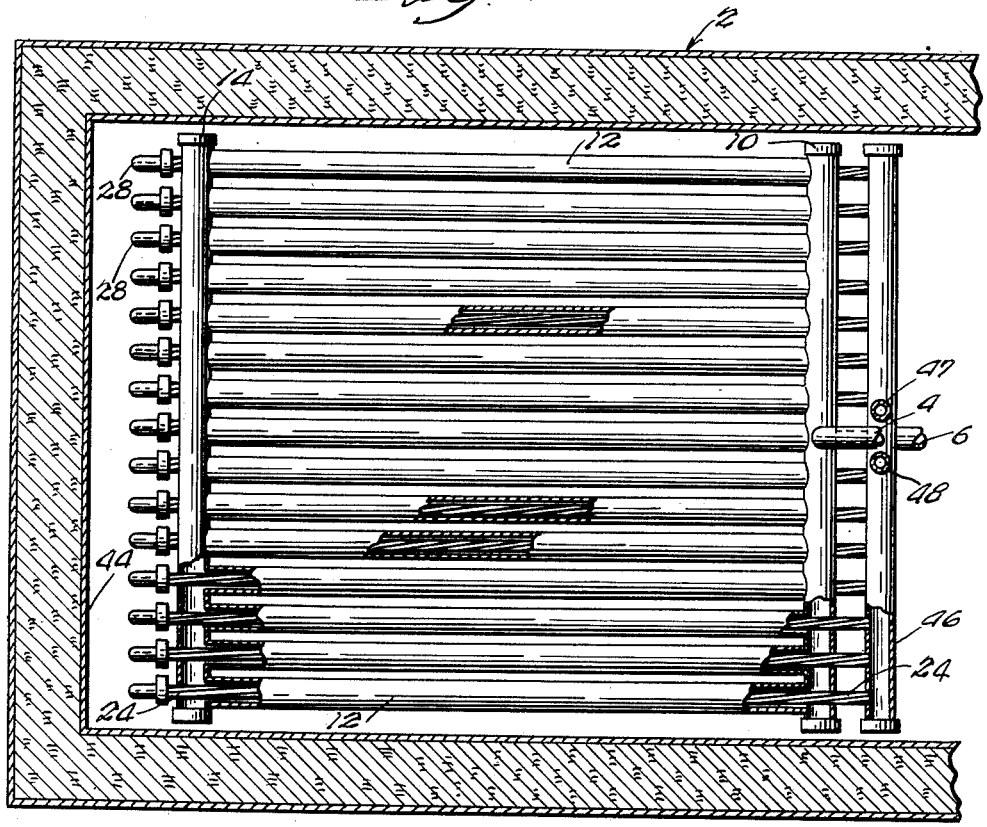
Fig. 7.
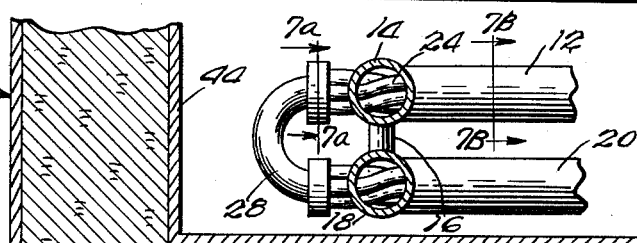
Fig. 7B.
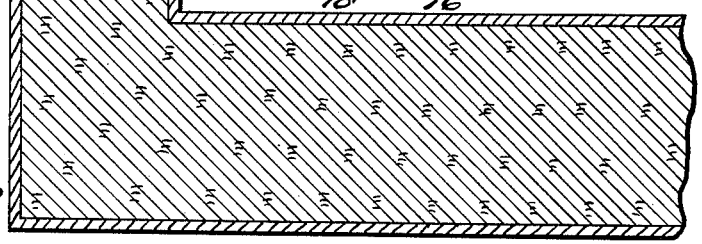
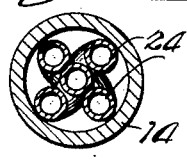
Fig. 7a.
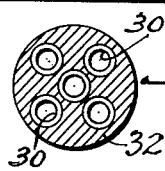
INVENTOR.
Joseph H. Lazar.
BY
B. Gordon Allen.

Patented Oct. 13, 1953

2,655,007

UNITED STATES PATENT OFFICE 2,655,007

SHELL FREEZER AND METHOD OF FREEZING LIQUIDS

Joseph H. Lazar, Chicago, Ill., assignor to Refrigeration Systems, Inc., Chicago, Ill., a corporation of Illinois Application May 29, 1951, Serial No. 228,893

8 Claims. (Cl. 62—104)

This invention relates to a novel method and means for freezing liquids, such as plasma, and relates more particularly to the freezing of such liquids in the form of an annulus within a container.

A primary object of the invention is to devise a freezing system which is compact, highly efficient, capable of handling a great number of containers simultaneously, and which reduces manual operations to a minimum.

A more specific object of the invention is to freeze plasma within a container at a more rapid rate than heretofore possible, without freezing the container stopper or sealer, which must be removed after freezing to accommodate dehydration of the frozen plasma according to well-known prior art practices. This object of the invention is accomplished by an unusually efficient method and means for removing heat from the container at a rapid rate while simultaneously heating the neck portion of the container, whereat the stopper or similar sealer is removably positioned to positively seal the container, which is rotated on a substantially horizontal axis during the freezing process so that the plasma is frozen into the form of an annulus within the container.

A further object of the invention is to devise a system capable of handling a maximum number of containers within a given freezing zone. This object is accomplished by arranging the containers end to end, with their necks at their remote ends and projecting out of the freezing zone into heating zones extending lengthwise of the freezing zone at opposite sides thereof.

Another object of the invention is to provide container rotating rollers, arranged in co-axial pairs, with driving means connected to the rollers of each pair to accommodate a maximum number of containers within a freezing tank or zone.

Still another object of the invention is to devise an unusually rapid method of freezing the plasma in the containers by rotating them in a liquid refrigerant which contacts the containers below their rotational axes, and by simultaneously spraying the refrigerant on the containers above their axes in such manner that the refrigerant is efficiently circulated through the system to maintain maximum cooling efficiency.

Yet another object of the invention is to circulate the refrigerant through the rollers to continuously cool the container contacting surfaces thereof, thereby increasing the rate at which the plasma in the containers is frozen.

A further object of the invention is to devise a closed circulation system for the liquid refrigerant to afford maximum cooling efficiency.

Still another object of the invention is to utilize the space available for the refrigerant conduits in such manner as to afford efficient cooling thereof by a primary refrigerant which is contained within passages enclosing the refrigerant conduits.

The foregoing and other objects of the invention will become apparent from a consideration of the following specification and the accompanying drawings, wherein:

Figure 1 is a perspective view of a novel apparatus utilized in the practice of the invention, Figure 2 is a top plan view of the apparatus with the upper cover plate removed, Figure 3 is a sectional view on the line 3—3 of Figure 2, Figure 4 is a sectional view on the line 4—4 of Figure 3, Figure 5 is a sectional view on the line 5—5 of Figure 3, Figure 6 is a sectional view on the line 6—6 of Figure 3, Figure 7 is an enlarged fragmentary vertical sectional view of the structure shown in Figure 6, Figure 7A is a sectional view on line 7A—7A of Figure 7, Figure 7B is a sectional view on the line 7B—7B of Figure 7, Figure 8 is a sectional view on the line 8—8 of Figure 5, Figure 9 is a fragmentary perspective view of one of the container supporting rollers, and Figure 10 is a sectional view on the line 10—10 of Figure 9.

Describing the invention in detail, and referring first to the novel apparatus disclosed in the drawings, an insulated container or casing 2 having a cover plate 3 (Figure 1) is provided, as best seen in Figures 2, 3, and 5, with inlet and outlet conduits 4 and 6 for any desired primary refrigerant, supplied by a conventional refrigeration system at any desired temperature value preferably between approximately −40° C. and −80° C.

The inlet conduit 4 is connected to a conventional thermostatic expansion valve 8, which is connected to an inlet header or manifold 10. The header 10 is connected to a plurality of upper pipes or conduits 12, which are, in turn, connected to a manifold 14 communicating by conduits 16 with a manifold 18. The manifold 18 is connected by lower pipes or conduits 20 to an outlet header or manifold 22, which is connected to the refrigerant outlet conduit 6.

The conduits 12 and 20, as best seen in Figures 3 and 6, extend lengthwise of the casing 2 and are substantially round in cross section, as best seen in Figures 5 and 7. Each of the conduits 12 and 20 contains five tubes 24 of novel form and arrangement to afford maximum efficiency of heat transfer. Tubes 24 are also round in cross section, as best seen in Figure 7A, and are arranged with the central tube 24, preferably contacting each of the remaining four tubes 24, all of which are spaced approximately equally from each other and preferably contact the inner surface of the surrounding conduit 12 or 20 to define interstices accommodating flow of a primary refrigerant between the inlet and outlet conduits 4 and 6. The tubes 24, as best seen in Figure 7, are preferably in spiral or helical form on a helical axis extending lengthwise of the casing 2, so that the interstices between these tubes are of correspondingly tortuous form to afford maximum heat transfer efficiency. This arrangement has proved in actual practice to be superior to any known in the prior art and facilitates quick freezing of the plasma, as hereinafter described.

The tubes 24 in the upper conduit 12 extend in sealed relationship through the upper headers 10 and 14, and the tubes 24 in the lower conduit 20 similarly extend in sealed relationship through the lower headers 18 and 22 and are connected outwardly of the headers 14 and 18 to elbows 28, as best seen in Figures 7 and 7A, wherein it will be seen that the tubes 24 are connected to each end of the elbow 28 by conventional brazed fitting in complementary holes 30 of a connector plate 32, which is also secured, as by soldering or brazing, to the elbow 28.

The tubes 24 in the bottom conduits 20 project longitudinally beyond the header 22 in sealed relationship thereto and are connected to a header or manifold 31, which is connected, as best seen in Figure 3, to the discharge side of a sump pump 32 driven by an armature shaft 34 of a motor 36 mounted in the casing 2 by brackets 38, the suction side of said pump being connected by ports 40 thereof to a body 42 of secondary refrigerant, such as alcohol, within a tank or reservoir 44, forming a freezing chamber contained within the insulated casing 2. Thus, the pump 32 forces the secondary refrigerant through the tubes 24 of the lower conduits 20 and thence through the elbows 28 and through the tubes 24 of the upper conduits 12 in counterflow to that of the primary refrigerant, which flows from the inlet conduit 4 to the header 10 and thence through the upper conduits 12 and pipes 16 into the lower conduits 20 to the outlet header 22, from which the primary refrigerant is conveyed from the system by the outlet pipe 6.

The tubes 24 of the upper conduits 12 project longitudinally beyond the header 10 in sealed relationship thereto, and the secondary refrigerant is conveyed through these tubes 24 to an outlet manifold 46, which is afforded a sealed connection to the tubes 24 and is connected to a pair of outlet pipes 47 and 48, each of which is connected to spray tubes 50 at one side of the tank 44.

Beneath the spray tubes 50 are rollers 52 which may be formed of stainless steel or any other suitable non-corrosive material having a high coefficient of heat conductivity. The rollers 52 are provided at their ends with trunnions 54, the outer trunnions being rotatably journaled in bearing plates or supports 56 within the tank 44. As best seen in Figures 4 and 5, the rollers are arranged in pairs, each pair being co-axial on a substantially horizontal axis and being connected to a common worm wheel 58 meshed with a worm 60. Preferably, the inner trunnion 54 of at least one of the rollers 52 of each pair is also rotatably supported by a bearing plate 62 adjacent the associated worm wheel 58, as best seen in Figure 5.

All of the worms 60 are co-axially arranged, as shown in Figures 3 and 4, and are interconnected by a shaft assembly 63, which is connected by drive gears 64 and 66 to a drive shaft 68 rotated by a conventional belt drive 70 operably connected to a motor 72 which may be conveniently mounted on the under side of the casing 2.

One of the rollers 52 is shown in detail in Figures 9 and 10, wherein it will be seen that the roller is in the form of a cylinder having an end wall or plate 74 at each extremity thereof, formed with the before-mentioned trunnion or shaft 54 and provided with slots or openings 76 accommodating passage of the liquid refrigerant 42 through the roller to afford heat transfer from the outer container contacting surface thereof. If desired, the slots 76 may be diagonally arranged with respect to the rotational axis of the roller to afford forced flow of the liquid refrigerant 42 therethrough, as diagrammatically shown in Figure 10. However, it will be understood that the slots 76 may be of any desired configuration, inasmuch as the rotation of the roller 52 and continuous circulation of the liquid refrigerant 42 through the tank 44, as hereinafter described, accommodates flow of the refrigerant through the roller.

Referring again to Figure 3, it will be seen that the rollers 52 are at least partially submerged in the liquid refrigerant 42, whereby containers 78 supported by the rollers 52 contact the liquid refrigerant below the horizontal rotational axes of the containers, which are continuously rotated by the rollers 52 toward the left end of the tank 44, as seen in Figures 2 and 3. At the same time, the liquid refrigerant 42 is sprayed from the tubes 50 against the containers 72 above their rotational axes and in the direction of their rotation, so that the sprayed refrigerant is continuously carried by the rotating containers 78 over the top surfaces thereof. Thus, the liquid refrigerant 42 is continously circulated over the tops of the containers 78 toward the left end of the tank, as seen in Figure 3, and is continuously circulated from the bottom of the tank 44 toward the right, as seen in Figure 3, inasmuch as the pump 32 is positioned in such manner as to suck the liquid refrigerant 42 from the bottom of the tank. This circulation system has proved, in actual practice, to be unusually efficient.

It may be noted that if the containers 78 were merely immersed in the refrigerant 42 and rotated therein, the refrigerant would tend to rotate with the containers in layers around the containers. Such laminar flow would tend to insulate the containers, reducing the efficiency of heat transfer therefrom, and one advantage of the invention is to disrupt such laminar flow and to produce turbulence in the refrigerant by the spray from tubes 50, preferably above the level of the body of refrigerant 42 in the tank 44.

As best seen in Figure 5, the necks 80 of the containers 78 extend through complementary arcuate notches 82 of the tank 44 into heating tanks 84 at opposite sides of the refrigerant tank 44 and extending lengthwise thereof, as best seen in Figure 2. Each heating tank 84 contains a heater 86 which may be of any desired construction but preferably comprises spaced inner and outer conduits 88 and 90 connected respectively to inlet and outlet conduits 92 and 94 through which a heating medium, such as hot glycol, is circulated at any desired temperature to prevent freezing of stoppers 96 on the necks 80 of the containers 78.

Thus, it will be understood that as the containers 78 are rotated the plasma which partially fills the containers is subjected to an intense freezing action by the refrigeration circulation system above described, and the necks 80 and stoppers 96 of the containers 78 are simultaneously heated in zones externally of the freezing zone to prevent freezing of the stoppers on the necks 80 of the containers. Thus, after the plasma within the containers 78 has frozen in the form of annuli within the respective containers, they may be manually removed from the apparatus, whereupon the stoppers 96 may be readily removed and the frozen plasma within the containers 78 may be dehydrated according to well known prior art practice.

As best seen in Figure 1, a convenient rack 86 is provided for supporting the containers 78 before and after the above-described freezing process. The rack 96 comprises converging diagonal support plates 98, each of which is provided with spacer plates 100 to separate the supported containers 78. The ends of the rack 96 are supported within slots 102 of brackets 104 mounted within the casing 2 above the spray tubes 50. As best seen in Figure 1, the above-described form and arrangement of the support rack 96 is such that containers 78 may be positioned on or removed from the rollers 52 without interference with the rack 96.

Preferably, an overflow tube 106 is provided within the tank 44 to maintain the level of liquid refrigerant 42 therein below a predetermined level. The overflow tube 106 is provided with a conventional fitting 108 at the bottom of the tank 44 which may be drained by removing the tube 106 from said fitting.

Changes may be made in form and substance without departing from the spirit of the invention or sacrificing any of the advantages and the right is hereby reserved to make all changes which fairly fall within the scope of the following claims.

What is claimed as new and desired to be secured by Letters Patent of the United States is as follows:

1. Apparatus for freezing plasma, comprising a tank, means in said tank for rotatably supporting containers of said plasma therein, means in said tank for cooling said containers to a temperature value below approximately −40° C., said tank having upwardly opening notches receiving associated necks of said containers, and means externally of said tank for positively heating said necks to a temperature value above the freezing point of said plasma.

2. Apparatus for freezing plasma, comprising a casing containing a freezing zone and a heating zone spaced therefrom, means for rotatably supporting associated containers in said freezing zone, and passages between said zones for receiving neck portions of said containers.

3. Apparatus for freezing plasma, comprising a tank containing a body of liquid refrigerant having a freezing point substantially below −40° C., means for supporting containers of said plasma in said tank, a conduit in said body, means for circulating a refrigerant through said conduit at a temperature not substantially higher than −40° C., five tubes extending through said conduit, four of said tubes contacting the conduit and the fifth tube contacting all of said four tubes, said tubes and conduit being substantially circular in cross section, whereby the spaces between said tubes form interstices accommodating flow of the second-mentioned refrigerant, means for spraying said containers and connected to said tubes, and pump means having a discharge side connected to said tubes, said pump means having a suction side connected to said body of liquid refrigerant.

4. A method of freezing liquid partially filling a substantially cylindrical container having a sealed neck of reduced diameter substantially coaxial with the axis of said container, said method comprising rotating said container on said axis while maintaining the axis substantially horizontal and while heating the neck to a temperature value above the freezing point of said liquid and simultaneously cooling the container to a temperature value below the freezing point of said liquid, whereby said liquid is frozen in the form of an annulus spaced from said neck within said container.

5. A method of freezing liquid in a container having a substantially coaxial neck of reduced diameter, said method comprising partly filling the container with said liquid, then attaching a removable stopper to the neck of said container, and then rotating the container on its axis while maintaining said axis substantially horizontal, and while cooling the container to a temperature value below the freezing point of said liquid and while simultaneously heating said neck to a temperature value above said freezing point, until said liquid has frozen into the form of an annulus within said container spaced from said neck.

6. A method of freezing liquid, comprising partly filling a container having a substantially coaxial neck of reduced diameter, then sealing said neck, and then rotating the container about its axis while maintaining the axis in a substantially horizontal position and while cooling the container to a temperature value below the freezing point of said liquid and simultaneously heating the neck to a temperature value above the freezing point of said liquid.

7. Apparatus for freezing plasma, comprising a casing, a chamber therein containing a body of liquid refrigerant, a plurality of rollers supported in said tank, said rollers being arranged in co-axial pairs, heating chambers at opposite sides of said refrigerant tank, said chambers comprising passage means accommodating necks of associated containers supported by said rollers, means for spraying said liquid against said containers above the level of said rollers, and a rack supported by said casing above said rollers and between said heating chambers, said rack comprising means for supporting said containers.

8. Apparatus for freezing plasma, comprising a tank containing a plurality of rollers, and means above the level of said rollers for spraying liquid refrigerant on associated containers supported by said rollers, wherein means are provided externally of said tank for heating neck portions of said containers and said tank is provided with arcuate passages complementary to, and adapted to afford passages for, said neck portions.

JOSEPH H. LAZAR.

References Cited in the file of this patent

UNITED STATES PATENTS

| Number | Name | Date |
|---|---|---|
| 2,140,043 | Zarotschenzeff | Oct. 13, 1938 |
| 2,256,745 | Magnuson | Sept. 23, 1941 |
| 2,342,706 | Tankersley | Feb. 29, 1944 |
| 2,441,730 | Strumia | May 18, 1948 |
| 2,484,297 | Klein | Oct. 11, 1949 |
| 2,494,864 | Erickson | Jan. 17, 1950 |